Oct. 18, 1966  W. L. SONES ETAL  3,279,481
DISHWASHER WITH SPEED CONTROL MEANS
Filed Aug. 31, 1964  3 Sheets-Sheet 1

INVENTORS
William L. Sones
James O. Elliott
BY George A. Neyhouse
J.C. Evans
Their Attorney INVENTORS
William L. Sones
James O. Elliott
George A. Neyhouse
BY J.C. Evans
Their Attorney INVENTORS
William L. Sones
James O. Elliott
George A. Neyhouse
BY
J.C. Evans
Their Attorney

United States Patent Office 3,279,481
Patented Oct. 18, 1966

3,279,481
DISHWASHER WITH SPEED CONTROL MEANS
William L. Sones, Dayton, James O. Elliott, Xenia, and George A. Neyhouse, Dayton, Ohio, assignors to General Motors Corporation, Detroit, Mich., a corporation of Delaware
Filed Aug. 31, 1964, Ser. No. 393,203
10 Claims. (Cl. 134—57)

This invention relates to a domestic appliance and more particularly to a dishwasher appliance including a control system for varying the cleaning action thereof in accordance with the types of articles being cleaned.

Present-day dishwashers typically include rinsing, washing and drying cycles and means for distributing a predetermined amount of washing fluid against the articles being cleaned during the rinsing and washing cycles. In such arrangements, the washing action, while suited for cleaning most articles, may not be sufficient in circulated volume or distribution pressure to adequately clean heavily soiled articles, for example, pots and pans or may be too strong for delicate articles such as fine crystal.

An object of the present invention, therefore, is to improve the cleaning action of domestic dishwashing apparatus by the provision of solid state semiconductor control means for varying the speed of an A.C. induction motor driving a fluid distributing pump to vary the quantity and pressure of washing fluid in accordance with the type of articles being cleaned.

A further object of the present invention is to improve the cleaning action of domestic dishwashing apparatus by the provision therein of a solid state semiconductor control means to maintain a constant speed of drive from a fluid distributing pump motor, said control means including a computer control package responsive to sensed conditions within the apparatus for varying the power supply to a fluid distributing pump motor to effect a variable cleaning action correlated to the sensed conditions.

A still further object of the present invention is to improve the cleaning action of a domestic dishwashing apparatus by the provision therein of an improved control system including a solid state computer for varying the power supply to a fluid distributing pump motor in accordance with preselectable settings of a dish cleaning programming means that is calibrated to produce a fluid flow from the pump matched to the types of articles being cleaned.

Yet another object of the present invention is to provide an improved control system for a dishwashing apparatus including a pump drive motor speed control computer having solid state semiconductor switch means therein for varying the power supply to the pump motor in accordance with sensed conditions within the dishwashing apparatus and including means for maintaining a preselected motor drive speed in part in response to a speed feedback signal from the pump drive motor.

Further objects and advantages of the present invention will be apparent from the following description, reference being had to the accompanying drawings wherein a preferred embodiment of the present invention is clearly shown.

Figure 1:
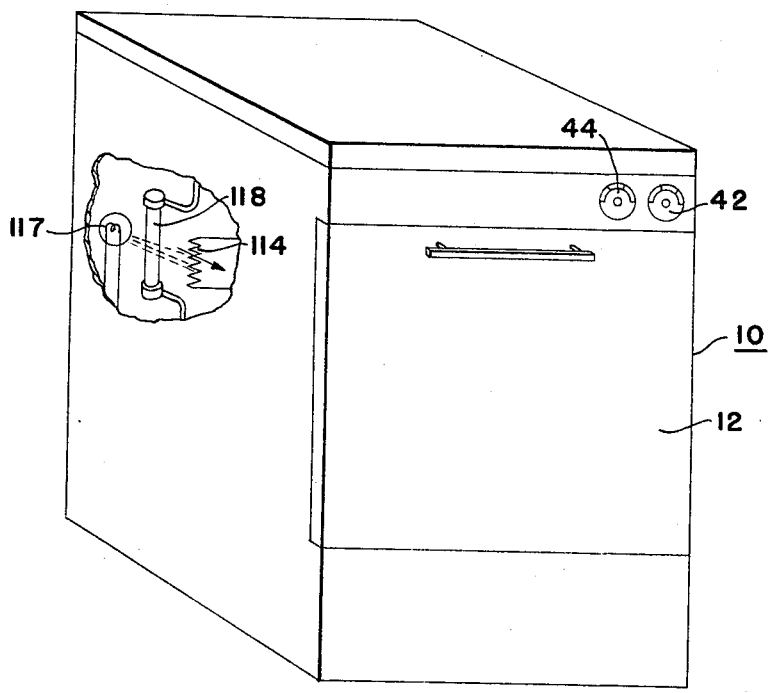
FIGURE 1 is a view in front elevation of a dishwasher including the present invention.

Referring now to the drawings in FIGURE 1, a dishwasher apparatus 10 is illustrated of the type more specifically set forth in United States Patent No. 3,117,-523, issued January 14, 1964, to Jacobs. The appliance 10 is representative of a suitable dishwashing apparatus suitable for association with the present invention and is shown as including a downwardly pivoted front door 12 for closing an access opening into a dishwashing compartment in which suitable dish rack supporting means are disposed for carrying articles to be cleaned with respect to a fluid distribution system.

Figure 3:
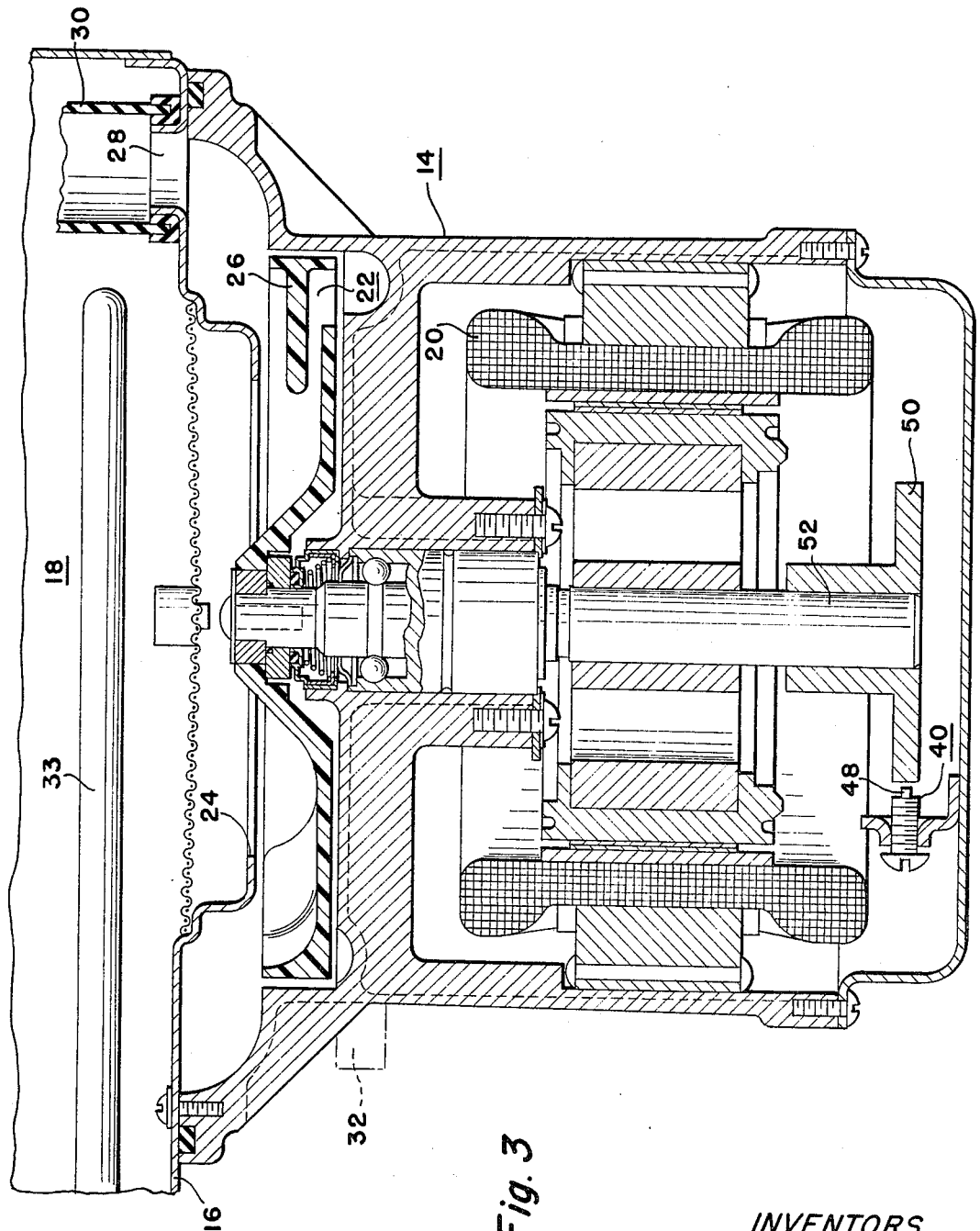
FIGURE 3 is an enlarged view in vertical section of a motor and fluid distributing pump in the dishwasher illustrated in FIGURE 1.

In FIGURE 3 a motor driven pump assembly 14 is illustrated that is adapted to be supported from a bottom bulkhead 16 of the appliance 10 that forms a sump region 18 therein. The motor driven pump assembly 14 basically includes an electric motor 20 operatively associated with a fluid distributing and drain pump 22 including an inlet opening 24 formed by the bottom bulkhead 16, an impeller 26 for drawing fluid from the inlet opening 24 and selectively discharging it through a first outlet 28 into a conduit 30 connected to the fluid distributing system in the washing compartment of the apparatus 10. The pump also connects to a drain pipe 32 for selectively discharging fluid in the washing compartment therefrom. The electric motor 20 is a reversible electric motor preferably of the A.C. induction type operable in a manner to drive the impeller 26 in reverse directions, one of which causes fluid to be distributed through the outlet opening 28 and the other of which causes fluid to be discharged through the drain pipe 32.

In the sump region 18 is included an electrical resistance element 33 for raising the temperature within the washing compartment during a drying cycle of operation.

Figure 2:
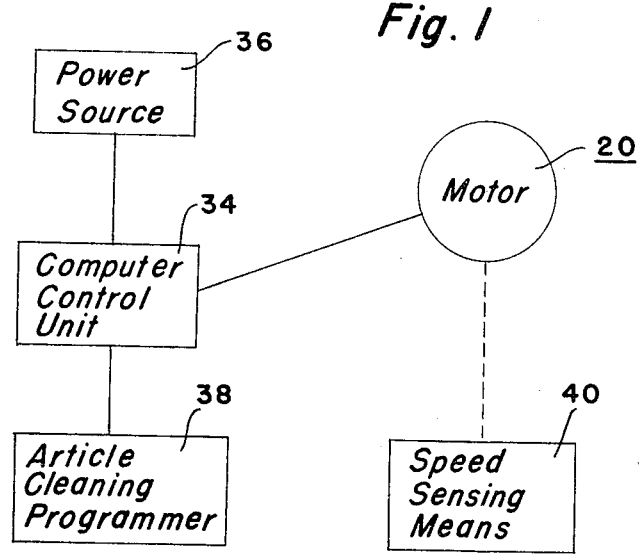
FIGURE 2 is a block diagram of the control system in the present invention.

In accordance with certain of the principles of the present invention the operation of the electric pump motor 20 is controlled by an improved system shown in FIGURE 2 as including a computer unit 34 for controlling the power supply from a power source 36 to the motor 20. The computer 34 takes into account the types of articles being cleaned within the dishwashing apparatus 10 as preset by an article cleaning programmer 38 that modulates an input signal to the computer unit 34 from speed sensing means 40 operatively associated with the motor 20. The computer 34 which is preferably a static solid state semiconductor network, receives signals from the speed sensing means 40 as modulated by the programmer 38 to meter 60-cycle power from the power source 36 to the motor 20 by varying the average input voltage to the motor 20 to thereby vary motor speed operation for producing a variable pump discharge rate and pump discharge pressure best suited for the type of articles being cleaned within the apparatus 10. The computer control unit 34 continually processes the speed signal from the speed sensing means 40 to maintain the motor 20 at a preselected reference speed norm corresponding to the desired cleaning action as preset by the article cleaning programmer 38.

In the illustrated embodiment of the invention, the article cleaning programmer 38 is illustrated as including in part a sequential controller for the dishwasher having a manually adjustable control member or dial 42 shown as being located on a control panel portion of the outer cabinet of the apparatus 10. This dial 42 is selectively positionable to establish a predetermined sequential cleaning action to be discussed. In addition to the presettable sequential controller, the programmer 38 includes another presettable control member 44 located adjacent the control member 42. The control member 44 has suitable indicia thereon corresponding to various types of article cleaning settings, for example, crystal, plastic dishes, pots and pans and the like.

In the illustrated arrangement, in order to control the pump output in accordance with the various article types as preset by the control member 44, the motor speed signal is modified by the programmer 38 to effect cleaning actions suited for the articles set by the control member 44. The signal from the speed sensing means 40, as modified by the programmer 38, is fed to the computer 34 for the maintenance of a particular average input voltage from the power source 36 to the motor 20 to maintain the particular motor speed suited for the particular type of preselected cleaning action irrespective of changes in the load on the motor 20 or changes in line voltage or the like that might vary the speed of the motor 20 from the speed at which the desired pumping action occurs.

Figure 4:
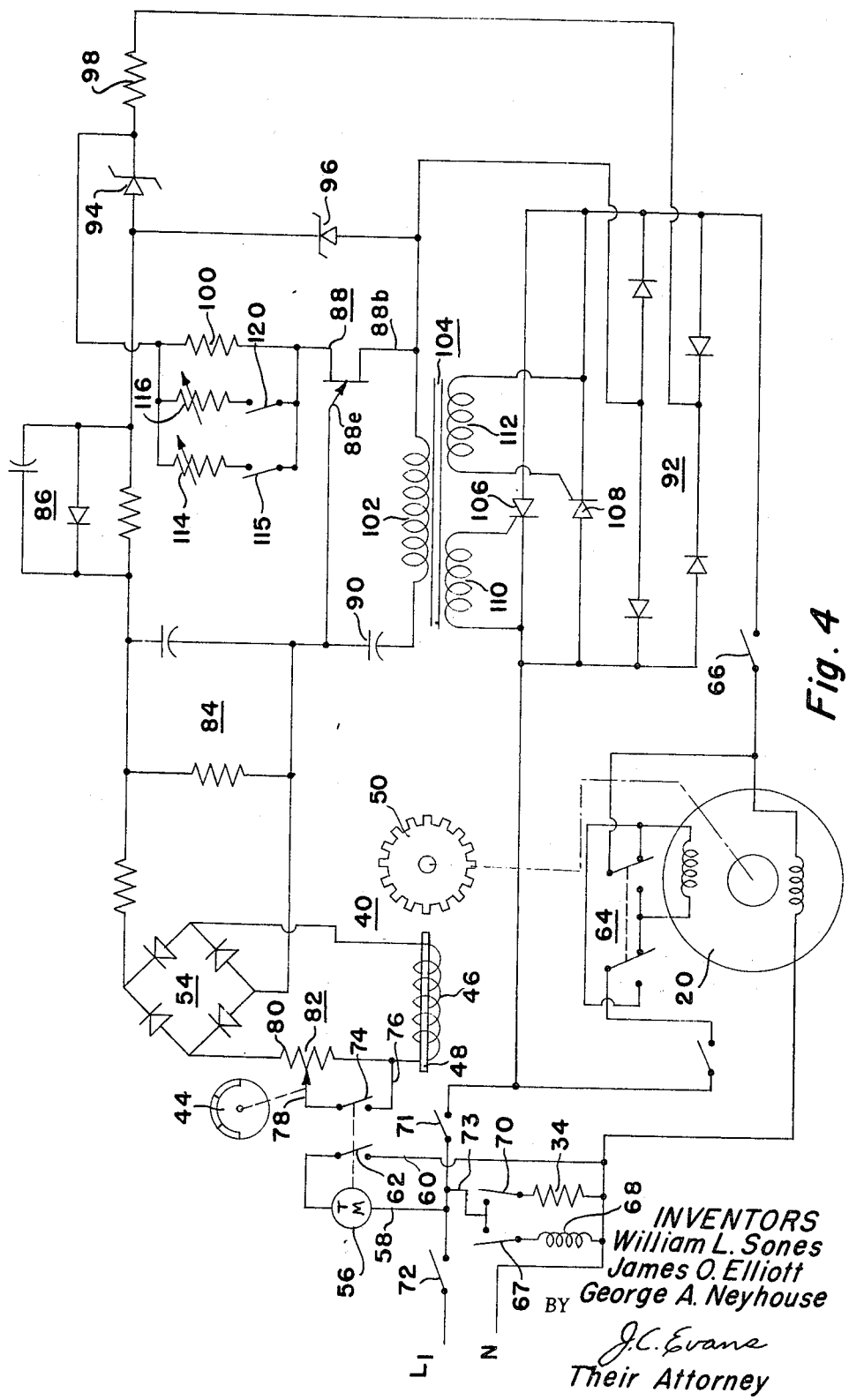
FIGURE 4 is a diagrammatic view of an electrical circuit constructed in accordance with principles of the present invention.

More particularly, in the illustrated arrangement, the speed sensing means 40 is illustrated as including a permanent magnet pickup means similar to the type used in dynamometers including a number of turns of wire 46 wound on a small magnet 48, as best illustrated in FIGURE 4. In the structural views a speed sensing pickup is preferably mounted on the motor housing so that the magnet 48 is located in radial alignment adjacent an outwardly toothed wheel 50 suitably journalled on a shaft extension 52 of the motor 20 for rotation therewith within the outer casing of the motor as shown in FIGURE 3. As the tooth wheel 50 rotates, the permanent magnet 48 is subjected to varying air gaps and the effective reluctance change causes flux changes therein which induce a varying voltage in the coil 46. This voltage varies both in frequency and amplitude depending upon the speed of rotation of the motor 20 and the signal is introduced to the computer control unit 34 to be rectified and converted by a full-wave rectifying bridge 54 therein.

The signal from the speed sensing pickup coil 46 is modified by the article cleaning programmer 38 in accordance with the settings established by the control member 44 by circuit means that are more specifically set forth along with the sequential control means commonly found in a dishwashing apparatus.

The dishwasher apparatus sequential control means for the motor 20 and heater 34 includes a timer motor 56 connected across lines $L_1$, N of a residential power source by conductors 58, 60. The timer, which is of a conventional type, includes a timer motor energization switch 62 in the conductor 60, a set of reversing contacts 64 for the motor 20, a motor energization switch 66, a fill switch 67 for a fill valve coil 68 and a cam actuator switch 70 for the heater 34.

Following loading of articles into the dishwashing apparatus 10, the door 12 is closed to effect a closure of a door interlock switch 71. The manual control member 42 is rotated then to an on position to close the timer motor switch 62 and a line switch 72 to initiate a sequential control including a washing cycle of operation. As cam actuated switches of the timer control package are selectively positioned, the fill switch 67 will be closed to energize coil 68 so that the fill valve is conditioned to supply a predetermined amount of water to the sump 18. At the same time or shortly before, the motor 20 will be energized to rotate the impeller 26 in a direction for recirculating fluid from the sump 18 through the conduit 30 to the fluid distributing system. Motor 20 is continuously energized during the washing process under the control of the computer control unit 34.

At the conclusion of the wash cycle, the timer will reverse the contacts 64 to reverse the operation of the motor 20. Thus, the impeller 26 is rotated in an opposite or drain direction to withdraw washing fluid from the sump 18 to be discharged through the drain pipe or conduit 32. If desired, the timer control can include another wash cycle or a rinse cycle following the drain cycles of operation.

Subsequent to these operations, a drying cycle is initiated by closing the timer actuated switch 70 to complete a circuit from line $L_1$ through a conductor 73, closed switch 70 and the heater 33 to line N. During this phase of the operation, the pump impeller 26 circulates heated air throughout the washing chamber to speed the drying cycle and to sterilize the dishes in a manner more specifically disclosed in the Jacobs patent mentioned above.

During the sequential control as preset by the control member 42, the article cleaning programmer 38 establishes a desired speed of rotation by the motor 20 to correspond to a particular type of article being cleaned as set by the member 44. More particularly, during the wash cycle of operation and the heating cycles of operation, a timer controlled switch 74 is closed in a conductor 76 connected to one terminal of the magnetic speed pickup coil 46. The conductor 76 is, in turn, electrically connected to an adjustable contact carrying arm 78 that contacts a variable resistance 80 of a speed norm program potentiometer 82. The contact carrying arm 78 is moved with respect to the resistance 80 by the article cleaning programmer control member 44 to vary the signal from the speed pickup sensing means 40 in a predetermined fashion for varying the speed of the motor 20 infinitely within a predetermined range so that, for example, if crystal is being washed within the washing apparatus 10, the power supply to the motor 20 will be maintained at a reduced speed norm at which the pressure and volume from the pump 22 is reduced to avoid damaging the articles being cleaned.

By varying the setting of the article cleaning programmer control member 44, for example, to a pots and pans setting, the speed pickup signal can be modulated so as to increase the power flow through the computer control unit 34 whereby the speed of rotation of the electric motor 20 is increased substantially to thereby cause a substantial increase in volume and pressure of the cleaning fluid being circulated thereby. Such increased volumes and pressures then act to perform a cleaning action more appropriate for pots and pans.

Referring now more particularly to the computer control unit 34, the modified speed pickup signals from the speed sensing means 40 as modified by the article cleaning programmer 38 are rectified by the bridge 54 to pass therefrom to capacitive filter unit 84. The filtered signal, in response to variations of the input signal from the magnetic speed pickup as modified by the programmer control, is then directed through a solid state semiconductor network including a unijunction transistor 88, connected emitter 88e to base 88b across a capacitor 90. The filtered signal from the magnetic speed pickup means 40 regulates firing of the transistor 88 in combination with a control potential produced by a bridge circuit 92 that rectifies the A.C. power source across silicon controlled rectifiers 106, 108 to D.C. power with the voltage across the output of the bridge 92 being regulated by Zener diodes 94, 96 in conjunction with resistances 98, 100. Depending upon the imbalance between the control potential produced by the bridge 92 that is fed through a filter unit 86 to the filter unit 84 and the variable input signal from the bridge 54 and capacitive filter 84, the unijunction transistor 88 fires to produce a motor control signal in a primary coil 102 of a pulse transformer 104. Firing of the transistor 88 allows the capacitor 90 to discharge through a low impedance path from the transistor emitter 88e, through base 88b and the primary coil 102 to produce a voltage spike therein. The voltage spike acts as a control signal that operates a solid state power supply switch for supplying power to the motor 20. In this embodiment of the invention the power supply switch is representatively illustrated as being a pair of oppositely facing silicon controlled rectifiers 106, 108 which are actuated by the induced voltage in the secondary coils 110, 112 of the transformer 104 to be conductive for a predetermined period of the full-wave form of the A.C. power supply across lines $L_1$, N to produce a variable energization of the motor 20 that controls the operative speed thereof at a substantially exact speed norm corresponding to the article cleaning program as established by the manually actuatable control member 44.

During both the washing and drying cycles of operation, it is desirable at times to modify the speed of operation of the motor 20 from that established by the control member 44 to reflect conditions such as cleanliness of the article during the washing cycle and dryness of the article during the drying cycle. In this case, variable resistance sensor elements 114, 116, are incorporated into the solid state semiconductor network to modify the power supply control signal in accordance with conditions such as cleanliness or dryness within the dishwashing apparatus 10. More particularly, the variable resistance temperature sensor 114 may be included in the circuit by a cam-actuated timer switch 115 during the cycle. The sensor 114 may be a light sensitive resistance element having a positive coefficient of resistance that varies in response to increased turbidity in the washing fluid. As the rinse water is circulated a beam from light source 117 can be directed through a turbidity sensing station or sight glass 118 to impinge on the light sensitive resistance 114. In cases where the water carries a substantial amount of residue material reflecting dirty articles, the rate of circulation of the rinse water can be increased for producing a further cleaning action over and above that produced during normally programmed washing cycles of operation. Similarly, during the drying operation a timer controlled switch 120 is closed to include the variable resistance sensor 116 in parallel with resistance 100. This sensor 116, if a positive coefficient of resistance humidity sensor, will detect the humidity in the washing compartment to increase the speed of rotation of the motor 20 upon sensing greater humidities for producing a greater drying effect over and above that established by the speed norm programmer member 44. As the humidity drops to reflect that the articles are drying, the sensor 116 will decrease in resistance to cut back the speed of the motor 20 and hereby cut back the air circulation of the impeller 26.

While the sensing units are illustrated as being positive coefficient of resistance elements, it will be appreciated that negative coefficient of resistance elements can be used by making appropriate changes in the solid state network to reflect this inversion.

By virtue of the above-illustrated speed norm programmer and solid state computer unit system for association with the variable speed reversible drive motor of a dishwashing apparatus, a user is able to preselect a wide range of dishwashing operations corresponding to particular types of articles being cleaned. In addition to the flexibility afforded by the article cleaning programmer means, the system is further responsive to sensed signals of conditions within the dishwasher to furthur modify the power supply to the motor to compensate for water cleanliness and humidity to effect an ultimate cleanliness condition following the timer programmed sequence of operation that has been heretofore unavailable in such apparatus.

The basic concept of a domestic appliance having an A.C. induction motor controlled by a static solid state or semiconductor computer unit is set forth in our copending United States application Serial No. 159,014, filed December 13, 1961 now Patent Number 3,152,462. The present invention incorporates the basic advantages of appliance control by such static state devices, namely greater control reliability and more exact control capability together with the further improvement comprising additional means for correlating the appliance operation to types of articles being cleaned including the provision of the article cleaning programmer in association with the solid state computer unit.

While the embodiment of the present invention as herein disclosed constitutes a preferred form, it is to be understood that other forms might be adopted.

What is claimed is as follows:

1. In a dishwashing apparatus, the combination of, means for distributing washing fluid against articles to be cleaned, means for actuating said fluid distributing means including prime mover means, semiconductor switch means in power supply relationship with said prime mover means, means for deriving a control voltage responsive to the speed of said prime mover means, means processing said control voltage for controlling conductivity of said semiconductor switch means to maintain said prime mover means at a predetermined speed norm, and article cleaning programmer means for infinitely varying said control voltage within predetermined limits to operate said prime mover means at variable speeds for producing a range of fluid distribution levels, said article programmer means including presettable means for selecting a fluid distribution level corresponding to one of a number of types of articles to be cleaned during the washing cycle of operating the dishwashing apparatus.

2. In a dishwashing apparatus, the combination of, pump means for distributing fluid against articles to be cleaned, means for driving said pump means including an electric motor means, means for electrically connecting said pump means to a source of power including semiconductor switch means, solid state computer means for controlling the conductivity of said semiconductor switch means, means for sensing the speed of said motor means and for feeding a signal to said computer means, to control the operation of said computer means, and article cleaning programmer means for modulating said speed signal to vary the input signal to said computer in accordance with the type of articles being cleaned by said fluid distributing means whereby the conductivity of said semiconductor switch means is infinitely varied between predetermined limits to vary the speed of said motor means and said motor means driving said pump means at like variable speeds for producing a range of fluid distribution levels therefrom, said article programmer means including presettable means for selecting a fluid distribution level corresponding to one of a number of types of articles to be cleaned during the washing cycle of operation of the dishwashing apparatus.

3. In the combination of claim 2, said presettable means being a manually adjustable control member, and variable resistance means positioned by said control member for modifying the signal of said speed sensing means in accordance with the type of article being cleaned 4. In a dishwashing apparatus, the combination of, pump means for distributing washing fluid against articles to be cleaned and for draining fluid from the apparatus, reversible motor means for operating said pump means, sequential controller means for reversing the direction of rotation of said motor for effecting fluid distributing and drying cycles of operation, semiconductor switch means for controlling the power supply to said motor means, solid state computer means for controlling the conductivity of said switch means, means for sensing the speed of said motor and for feeding a signal thereof to said computer unit to regulate the operation of said computer unit to maintain a predetermined desired motor speed of operation during both fluid distributing and drying cycles of operation, and article cleaning programmer means for preselecting a speed of motor operation during the fluid distributing cycle of operation to produce a fluid discharge pressure from said pump means corresponding to the articles being cleaned including means for varying the speed sensing signal to modulate the motor controlling action of said semiconductor switch means in accordance with the articles being cleaned.

5. In a dishwashing apparatus, the combination of, pump means for distributing cleaning fluid against articles to be cleaned, means for actuating said fluid distributing means including prime mover means, means for sensing at least two conditions in said cleaning fluid and adapted to produce at least two signals in proportion respectively to each of said sensed conditions, computer control means including semiconductor switch means in power supply relationship with said prime mover means, means processing said signals for controlling the voltage characteristic of power supplied by said semiconductor switch means, and article cleaning programmer means for infinitely varying at least one of said signals within predetermined limits to operate said prime mover means at variable speeds for producing fluid distribution corresponding to a particular type of article being cleaned during the operative cycles of the dishwashing apparatus.

6. In the combination of claim 5, said article cleaning programmer means including a manually adjustable control member for preselecting a type of motor operation corresponding to a particular article being cleaned, and variable resistance means positioned by said control member for modifying said signal in accordance with the type of article being cleaned.

7. In the combination of claim 5, said sensing means including a turbidity sensing means for measuring the level of waste material in the distributed cleaning fluid.

8. In the dishwashing apparatus, the combination of, pump means for distributing cleaning fluid against articles and for discharging fluid from the apparatus, reversible motor means for operating said pump means, sequential controller means for reversing the direction of rotation of said motor for effecting fluid distributing and drying cycles of operation, means for sensing conditions of said cleaning fluid during both distributing and drying cycles and adapted to produce a signal proportional to said condition, computer control means including semiconductor switch means for controlling the power supply to said motor means, means in said control means for processing said signals to regulate the conductivity of said switch means to maintain a motor speed of operation responsive to said sensed conditions during both fluid distributing and drying cycles of operation.

9. In the combination of claim 8, said sensing means including a humidity sensor for measuring the moisture in said cleaning fluid during the drying cycle of operation.

10. In a dishwashing apparatus, the combination of, pump means for distributing washing fluid against articles to be cleaned, means for driving said pump means including electric motor means, circuit means for supply power to said electric motor means to drive said pump means during a cleaning cycle of operation wherein a fluid is discharged from said pump means against articles to be cleaned, said circuit means including means for establishing a first speed of operation of said motor means during said cleaning cycle whereby said pump means discharges first amount of fluid against the articles to be cleaned, and article programmer means for conditioning said circuit means to vary the power supply to said motor means within predetermined limits whereby said pump means is adapted to produce a range of fluid distribution levels during said cleaning cycle, said programmer means including pre-settable means for selecting a fluid distribution level from said pump means corresponding to one of a number of types of articles to be cleaned, said selected fluid distribution level discharged from said pump means during said cleaning cycle producing an optimum cleaning of particular types of articles being cleaned during said cycle.

References Cited by the Examiner

UNITED STATES PATENTS

| | | | |
|---|---|---|---|
| 1,833,374 | 11/1931 | Renshaw | 134—58 |
| 2,980,120 | 4/1961 | Jacobs | 134—57 |
| 3,114,253 | 12/1963 | Morey et al. | 68—12 |
| 3,152,463 | 10/1964 | Sones et al. | 68—12 |

CHARLES A. WILLMUTH, *Primary Examiner.*

R. L. BLEUTGE, *Assistant Examiner.*